United States Patent
Nemoto

[19]

[11] Patent Number: 5,855,447
[45] Date of Patent: Jan. 5, 1999

[54] BALL JOINT ASSEMBLY

[75] Inventor: Akira Nemoto, Toyohashi, Japan

[73] Assignee: Musashi Seimitsu Kogyo Kabushiki Kaisha, Toyohashi, Japan

[21] Appl. No.: 489,861

[22] Filed: Jun. 13, 1995

[30] Foreign Application Priority Data

Jun. 20, 1994 [JP] Japan .................................. 6-162761

[51] Int. Cl.$^6$ .................................................. F16C 11/06
[52] U.S. Cl. ......................... 403/122; 403/135; 403/141
[58] Field of Search .................................. 403/132, 133, 403/122, 134, 135, 140, 141, 142, 143, 59

[56] References Cited

U.S. PATENT DOCUMENTS

| | | | |
|---|---|---|---|
| 2,293,582 | 8/1942 | Whittingslowe | 403/122 |
| 3,545,797 | 12/1970 | Korecky | 403/140 X |
| 4,266,883 | 5/1981 | Riester et al. | 403/134 |
| 4,410,295 | 10/1983 | Ersoy et al. | 403/135 X |
| 4,552,480 | 11/1985 | McIntyre | 403/134 X |
| 5,044,811 | 9/1991 | Suzuki et al. | 403/134 |
| 5,152,628 | 10/1992 | Broszat et al. | 403/122 X |
| 5,163,772 | 11/1992 | Wood | 403/133 |
| 5,352,059 | 10/1994 | Ueno et al. | 403/122 |

FOREIGN PATENT DOCUMENTS

| | | | |
|---|---|---|---|
| 308777 | 3/1989 | European Pat. Off. | 403/122 |
| 379392 | 7/1990 | European Pat. Off. | 403/141 |
| 3119061 | 4/1982 | Germany | 403/122 |
| 0875003 | 8/1961 | United Kingdom . | |
| 1087194 | 10/1967 | United Kingdom . | |

*Primary Examiner*—Harry C. Kim
*Attorney, Agent, or Firm*—Ladas & Parry

[57] ABSTRACT

A ball joint of the present invention joins a pair of members so that relative pivotal movement of the pair of members is permitted. The ball joint comprises a ball stud to be connected to one of the pair of members, a bearing support rod to be connected to the other member, and a cup-shaped bearing for supporting the ball stud on the rod. The bearing is formed of an elastic polymeric material and has an expandable open end to permit the ball of the ball stud to be put in and taken out of a hollow defined by the spherical inner surface of the bearing through the open end. The opposite ends of a rod forming the bearing support rod is bent in a ring-shaped heads, respectively. When the bearing is fitted in the ring-shaped head, the ring-shaped head compresses the bearing so that the ball of the ball stud is unable to come off the bearing. The ball joint of the present invention comprises a comparatively small number of component parts and has a simple construction, and any expensive manufacturing facilities are not necessary for manufacturing and assembling the component parts.

10 Claims, 4 Drawing Sheets

BALL JOINT ASSEMBLY

FIELD OF THE INVENTION

The present invention relates to a ball joint for joining a pair of members so that relative pivotal movement of the pair of members is permitted and, more specifically, to a ball joint having a simple construction and capable of being manufactured at reduced manufacturing costs.

DESCRIPTION OF THE PRIOR ART

A ball joint has been used for pivotally joining, for example, a pair of suspension links of an automobile.

As shown in FIG. 8, a ball joint 50 disclosed in Japanese Utility Model Laid-open (Kokai) No. 2-72811 comprises a ball stud 53 having a spherical ball 51 and a stem 52 extending from the ball 51, a resin bearing 54 slidably supporting the ball 51 of the ball stud 53, and a substantially cylindrical socket 55 holding the bearing 54 slidably supporting the ball 51 of the ball stud 53. When assembling the ball joint 50, the bearing 54 is put on the ball 51, the bearing 54 and the ball 51 are put in the hollow 55a of the socket 55 so that the stem 52 of the ball stud 53 extends through the one open end 56 of the socket 55, and then an end plate 57 is attached to the other open end 58 of the socket 55 to close the open end 58.

As shown in FIG. 9, a ball joint 60 disclosed in Japanese Patent Laid-open (Kokai) No. 62-184217 comprises a ball stud 63 having a spherical ball 61 and a stem 62 extending from the ball 61, a pair of resin bearings 64 and 65 slidably supporting the ball 61 of the ball stud 63, and a socket 66 holding the pair of bearings 64 and 65 slidably supporting the ball 61. The socket 66 is formed by combining an upper housing member 67 and a lower housing member 68, which are formed by pressing steel sheets. When assembling the ball joint 60, the pair of bearings 64 and 65 are put on the ball 61, the pair of bearings 64 and 65 combined with the ball 61 are placed between the upper housing member 67 and the lower housing member 68, and then the upper housing member 67 and the lower housing member 68 are fixedly joined together by folding the periphery 68a of the lower housing member 68 to complete the ball joint 60.

Some problems arise in these prior art ball joints.

First the ball joints have a comparatively large number of parts, which will increasing their manufacturing costs. The aforesaid ball joint 50 needs a bearing 54 and the end plate 57. The edge 55c of the socket 55 must be caulked after fitting the periphery of the end plate 57 in a groove 55b formed in the socket 55 to fasten the end plate 57 fixedly in place, which requires additional assembling time.

Similarly, the aforesaid ball joint 60 needs the pair of bearings 64 and 65, the upper housing member 67 and the lower housing member 68. The periphery 68a of the lower housing member 68 must be folded after assembling those parts to fixedly join together the upper housing member 67 and the lower housing member 68, which requires additional assembling time.

Secondly, special manufacturing facilities are necessary for manufacturing these prior art ball joints. When forming the socket 55 of the aforesaid ball joint 50, one end of a rod 59 needs to be formed in the shape of the socket 55 by cold forging, followed by machining to form the open end 56 through which the stem 52 of the ball stud 53 extends outside, the hollow 55a for housing the ball 51 and the pair of bearings 54 and the groove 55b for retaining the end plate 57. Therefore, expensive forging dies for cold-forging the socket 55, and machining facilities are necessary for manufacturing the ball joint 50.

Similarly, the manufacture of the aforesaid ball joint 60 needs expensive press dies for press working steel sheets to form the upper housing member 67 and the lower housing member 68 of the socket 66, and a bending press for fixedly joining together the upper housing member 67 and the lower housing member 68.

Thus, the prior art ball joints have a complicate construction, are composed of many parts and requires a large amount of time for manufacture and assembling. Since the manufacture of the prior art ball joints needs special facilities including the expensive dies, the manufacturing costs of the prior art ball joints cannot be reduced.

SUMMARY OF THE INVENTION

An object of the present invention is to provide a ball joint having a comparatively small number of component parts and capable of being easily assembled and of being manufactured without requiring expensive facilities.

With the foregoing object in view, the present invention provides a ball joint for joining a pair of members so that the relative pivotal movement of the pair of members is permitted comprising a ball stud to be connected to one of the pair of members, a bearing support rod to be connected to the other member, and a bearing interconnecting the ball stud and the bearing support rod; characterized in that the ball stud has a spherical ball, and a stem to be connected to one of the pair of members, extending from the ball, the bearing support rod has a bar-shaped body to be connected to the other member, and a toroidal head formed by bending one end of the bar-shaped body, the bearing has a spherical inner surface slidably fitting the ball so as to cover at least half of the ball, an open end through which the stem extending from the ball seated on the spherical inner surface extends outside and a neck formed by forming a circular groove in the outer surface therefore so as to be fitted in the toroidal head of the bearing support rod, the bearing is formed of an elastic polymeric material that allows the expansion of the open end of the bearing to an extent that allows the ball to pass the expanded open end into the bearing; also the neck of the bearing is fitted in the toroidal head of the bearing support rod after fitting the ball in the bearing.

The ball joint in accordance with the present invention comprising a single ball stud, a single bearing and a single bearing support rod has a comparatively small number of component parts, which is simple in construction and can be easily assembled. Since the toroidal head of the bearing support rod for holding the bearing can be formed by bending a bar, the manufacture of the ball joint does not need any expensive manufacturing facilities for forming the socket by forging and forming the housing members by pressing, which is necessary for manufacturing the prior art ball joints.

The toroidal head of the bearing support rod is formed in an inside diameter smaller than the outside diameter of the neck of the bearing in a state before being fitted in the toroidal head, so that the bearing can be compressed by the toroidal head of the bearing support rod and, consequently, the bearing is unable to fall off the toroidal head of the bearing support rod, also the ball of the ball stud is unable to come off the bearing. A large load can be transmitted through the bearing between the bearing support rod and the ball stud.

Forming the toroidal head of the bearing support rod with the extremity of a portion of the bar, forming the toroidal head spaced apart from the outer surface of a portion of the bar, forming the bar-shaped body or the toroidal head facilitates the adjustment of the accuracy of the interference of the inside diameter of the toroidal head.

Fixing the extremity of a portion of the rod, forming the toroidal head to the outer surface of a portion of the rod, forming the bar-shaped body prevents the expanding deformation of the toroidal head and prevents the bearing from falling off the toroidal head.

When the neck of the bearing is formed by forming a groove in the outer surface of a portion of the bearing to be set in engagement with the outer surface of the bearing support rod, the bearing can be firmly fitted in the toroidal head, so that the bearing is unable to fall off the toroidal head.

When the bearing is formed so that the center circle of the groove and the center of the spherical inner surface are included in a plane, any force that tends to force the bearing to fall off the ball of the ball stud will not act on the bearing even if an external force acts on the toroidal head of the bearing support rod.

When the neck of the bearing is formed near the open end of the bearing, the open end of the bearing is compressed by the toroidal head so that the open end may not expand, therefore consequently, the ball of the ball stud is unable to come off the bearing.

When a positioning projection, which comes into contact with the bearing support rod when the bearing is put in place on the bearing support rod, is formed near the neck of the bearing, the neck of the bearing can be accurately positioned relatively to the toroidal head.

When the bar-shaped body of the bearing support rod is formed so that the extension of its axis may pass the center of the ball of the ball stud, an axial force acting on the bearing support rod can be applied to the center of the ball, so that the application of an external force that tends to force the bearing to come off the ball to the bearing can be prevented.

When the polymeric material forming the bearing is an elastomer, the open end of the bearing can be expanded to enable the ball of the ball stud to pass the open end of the bearing.

When the bearing support rod is formed by processing a spring steel rod stock, the resistance of the toroidal head against the action of an axial force applied to the bearing support rod and tending to expand the toroidal head is higher than that of the bearing support rod formed by processing an ordinary structural steel rod stock. Therefore the bearing support rod formed by processing a spring steel rod stock is capable of more effectively preventing the bearing from falling off the toroidal head than the bearing support rod formed by processing an ordinary structural steel rod stock.

DETAILED DESCRIPTION OF THE PREFERRED EMBODIMENTS OF THE INVENTION

Ball joints in preferred embodiments according to the present invention will be described in detail hereinafter with reference to FIGS. 1 to 7.

Figure 1:
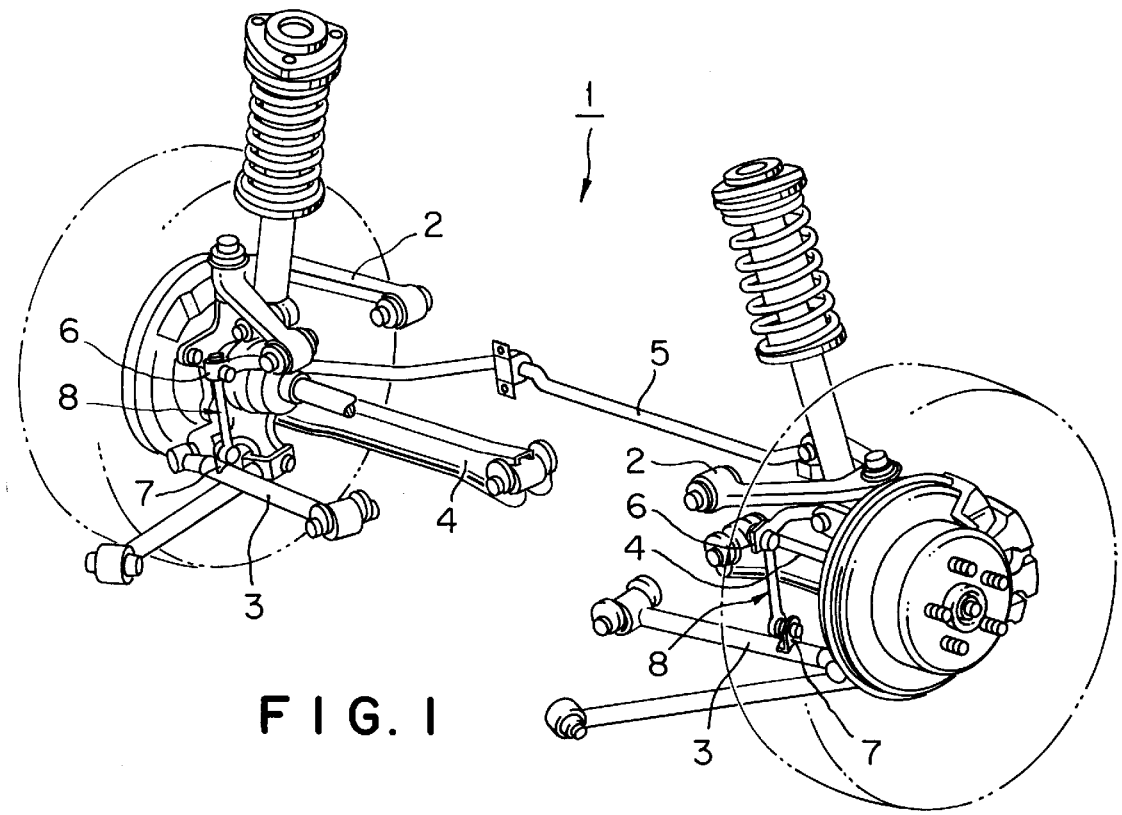
FIG. 1 is a perspective view of a suspension system of an automobile to be used in explaining the position of a connecting link to which a ball joint of the present invention is applied.

The structure of an automotive suspension system incorporating ball joints of the present invention will be described with reference to FIG. 1 prior to the description of the structure of a ball joint of the present invention. Referring to FIG. 1, each of the suspensions of a double-wishbone suspension system 1 comprises an A-shaped upper arm 2 and a pair of lower arms 3 and 4. A stabilizer is extended between the suspensions to suppress the rolling of the body while the automobile turns. The opposite ends 6 of the stabilizer 5 are connected to brackets 7 attached to the lower arms 3 by connecting links 8, respectively.

The connecting link 8 comprises a bearing support rod 10 provided with toroidal heads 12 at its opposite ends, respectively, a pair of bearings 20 fitted in the pair of toroidal heads 12, respectively, ball studs 30 supported in the bearings 20, respectively, and dust boots 40. Each of the toroidal heads 12 of the bearing support rod 10, the bearing 20 fitted in the toroidal head 12, and the ball stud 30 supported in the bearing 20 form a ball joint 100 of the present invention. Thus, the connecting link 8 is formed by connecting the two ball joints 100 by the straight body 11 of the bearing support rod 10.

Figure 2:
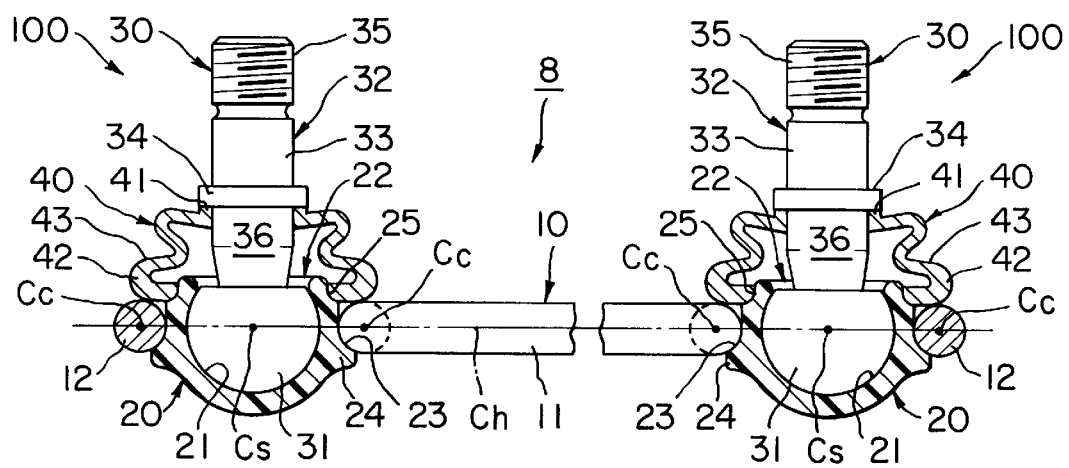
FIG. 2 is a longitudinal sectional view of the connecting link shown in FIG. 1.

Referring to FIG. 2, the support rod 10 is formed by processing a hot-rolled rod stock of a circular section and has a straight body 11, and the toroidal heads 12 formed by bending the opposite ends of the body 11. The bearing support rod 10 can be formed by very simple processes, i.e., a process of cutting out a rod of a predetermined length from a coil of a hot-rolled rod stock, and a process of bending the opposite ends of the rod at room temperature. Therefore, any expensive manufacturing facilities, such as cold forging facility, which is necessary for fabricating the socket of the prior art ball joint, and a press for forming the plate housing members, are not necessary, and the bearing support rod 10 can be formed in a short time at a low cost.

Figure 3:
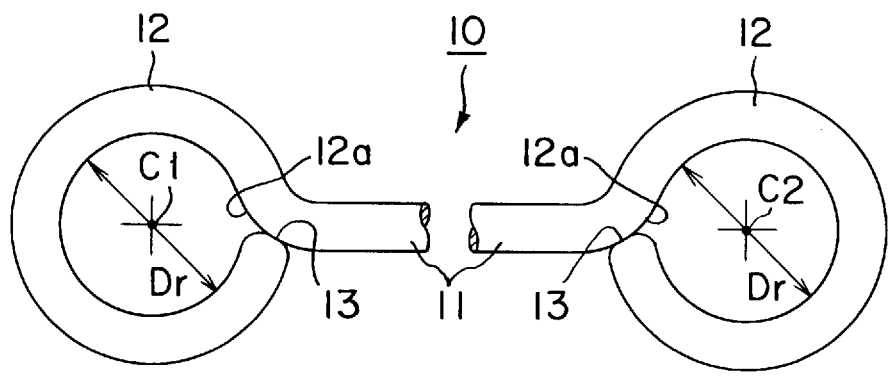
FIG. 3 is a plan view of a bearing support rod shown in FIG. 2.

As shown in FIG. 3, the extremity 13 of a portion of the rod, forming the toroidal head 12 is in contact with the outer surface 12a of the toroidal head 12. When the toroidal head 12 is formed with a space between the extremity 13 and the outer surface 12a of the toroidal head 12, work for forming the toroidal head 12 in an inside diameter Dr is facilitated. When the extremity 13 is welded to the outer surface 12a, the toroidal head 12 is prevented from expansion and the accuracy of fit between the toroidal head 12 and the bearing 20 can be enhanced. When the bearing support rod 10 is formed by processing a spring steel rod stock, the toroidal head 12 will not expand even if a large axial force acts on the bearing support rod 10.

As shown in FIG. 2, the axis Ch of the straight body 11 is on a plane including the center circles Cc of the toroidal heads 12 and passes the centers Cs of the balls 31 of the ball studs 30, so that any force that tends to separate the bearings 20 from the corresponding balls 31 will not act on the bearings 20 even if a large axial force acts on the bearing support rod 10.

Figure 4:
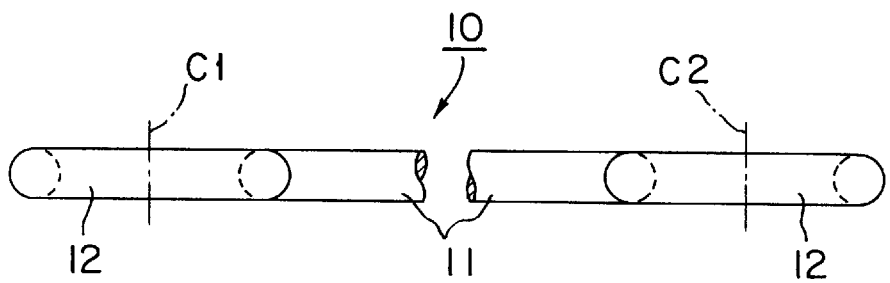
FIG. 4 is a side view of the bearing support rod shown in FIG. 3.
Figure 5:
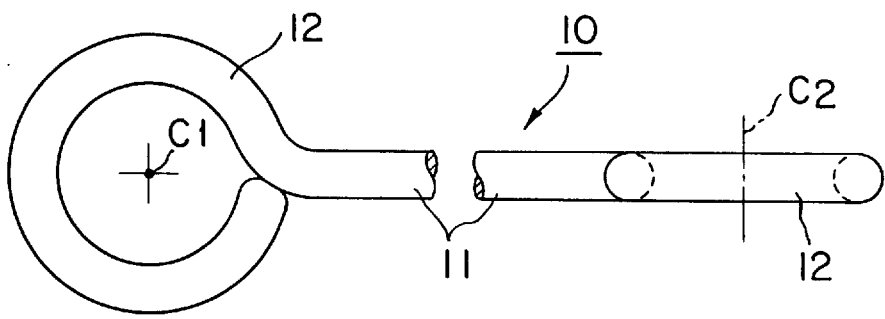
FIG. 5 is a plan view of a modification of the bearing support rod shown in FIG. 3.

As shown in FIGS. 3 and 4, the toroidal heads 12 of this bearing support rod 10 are formed so that their center axes C1 and C2 are parallel to each other. The toroidal heads 12 may be formed so that their center axes C1 and C2 are perpendicular to each other as shown in FIG. 5.

Each bearing 20 is formed of a polymeric material by injection molding and has a spherical inner surface 21 fitting the ball 31 of the ball stud 30, an open end 22 through which the stem 32 of the ball stud 30 extend outside when the ball 31 is seated on the spherical inner surface 21, and a neck 23 to be fitted in the toroidal head 12 of the bearing support rod 10, formed by forming a circular groove in the outer surface of the bearing 20.

Figure 6:
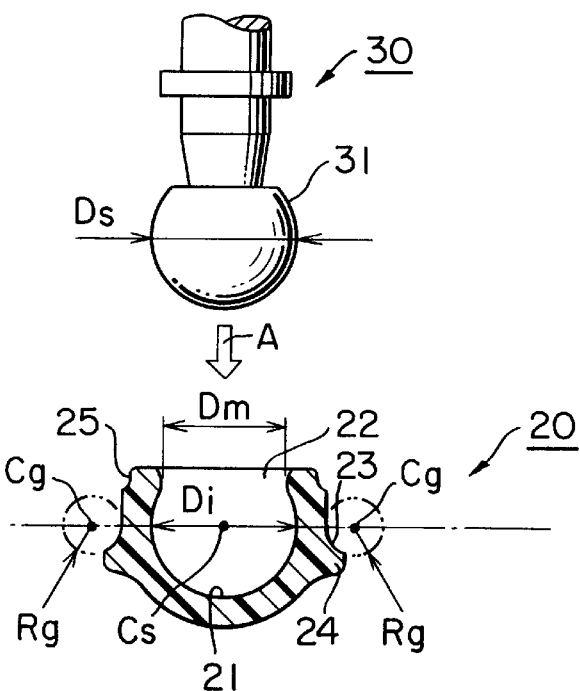
FIG. 6 is an exploded longitudinal sectional view of an assembly of a ball stud and a bearing.

As shown in FIG. 6, the inside diameter Di of the spherical inner surface 21 is equal to the diameter Ds of the ball 31 and the inside diameter Dm of the open end 22 is smaller than the diameter Ds of the ball 31. Therefore, the bearing 20 covers not less than half of the ball 31, and the ball 31 is able to turn in the bearing 20 within a certain angle in the planes passing through the center thereof.

As shown in FIG. 6, the neck 23 is formed by forming a circular groove of a substantially semicircular section in the outer surface of the bearing 20. A plane including the neck 23 is parallel to a plane including the periphery of the open end 22. The radius Rg of the section of the circular groove forming the neck 23 is equal to the radius Rr- of the circular section of the rod forming the bearing support rod 10. Thus, the bearing 20 can be surely fitted in the toroidal head 12 of the bearing support rod 10.

The circular groove forming the neck 23 is formed so that a plane including the center circle Cg of the groove includes the center Cs of the spherical inner surface 21. Therefore, any force tending to force the bearing 20 to come off the ball 31 of the ball stud 30 will not act on the bearing 20 even if an external force acts on the toroidal head 12 of the bearing support rod 10.

The bearing 20 is formed of PELPLANE (Toyobo), i.e., a commercial polyester elastomer, by injection molding. Therefore, the open end 22 of the bearing 20 can be expanded to an extent that permits putting the ball 31 into and taking the same out of the spherical hollow of the bearing 20 defined by the spherical inner surface 21 through the open end 22.

As shown in FIG. 6, a circular flange 24 is formed on the outer surface of the bearing 20 one side of the circular groove forming the neck 23 opposite to the other side of the side of the open end 22. The lower end 42 of the dust boot 40 is put on a portion 25 of the bearing 20 near the open end 22.

Referring again to FIG. 2, the ball stud 30 has the spherical ball 31 and the stem 32 extending from the ball 31. The stem 32 has a body portion 33 to be fitted in a through hole formed in the end 6 of the stabilizer 5 or the bracket 7, a flange 34 to be brought into contact with the end 6 or the bracket 7, and a threaded portion 35 for use in fastening the ball stud 30 to the end 6 or the bracket 7. The upper end 41 of the dust boot 40 is put on a neck portion 36 of the stem 32 between the ball 31 and the flange 34. The ball stud 30 is the same as conventional ball stud in material and method of manufacturing is the same.

The dust boot 40 shown in FIG. 2 is formed of rubber by molding. The dust boot 40 shields the bearing 20 from dirt and sand scattered and muddy water splashed when the automobile travels. The smaller upper end 41 and the larger lower end 42 of the dust boot 40 are put tightly on the neck portion 36 of the stem 32 of the ball stud 30 and the portion 25 of the bearing 20, respectively. The bellows-shaped body 43 of the dust boot 40 is bendable according to the turning motion of the ball stud 30 relative to the bearing 20. Grease is sealed in the space defined by the dust boot 40 to lubricate the sliding surfaces of the ball 31 and the bearing 20.

A procedure for assembling the ball joint 100 will be described hereinafter with reference to FIGS. 6 and 7.

When assembling the ball joint 100, first the ball 31 of the ball stud 30 is inserted through the open end 22 of the bearing 20 into the hollow defined by the spherical inner surface 21 as indicated by the arrow A in FIG. 6. As mentioned above, the open end 22 is forced to expand to permit the insertion of the ball 31 into the hollow since the bearing 20 is formed of an elastic elastomer.

Figure 7:
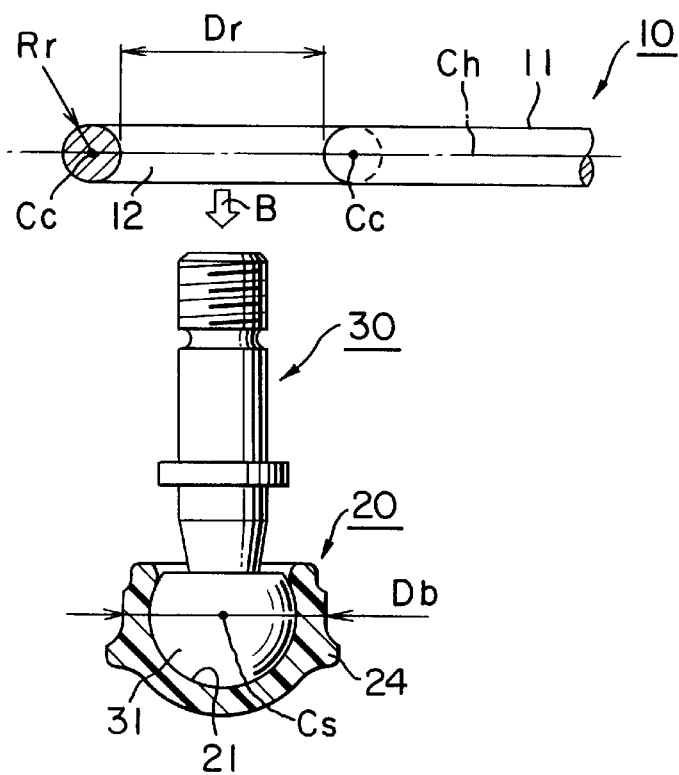
FIG. 7 is an exploded longitudinal sectional view of an assembly of a ball stud, a bearing and a bearing support rod.
Figure 8:
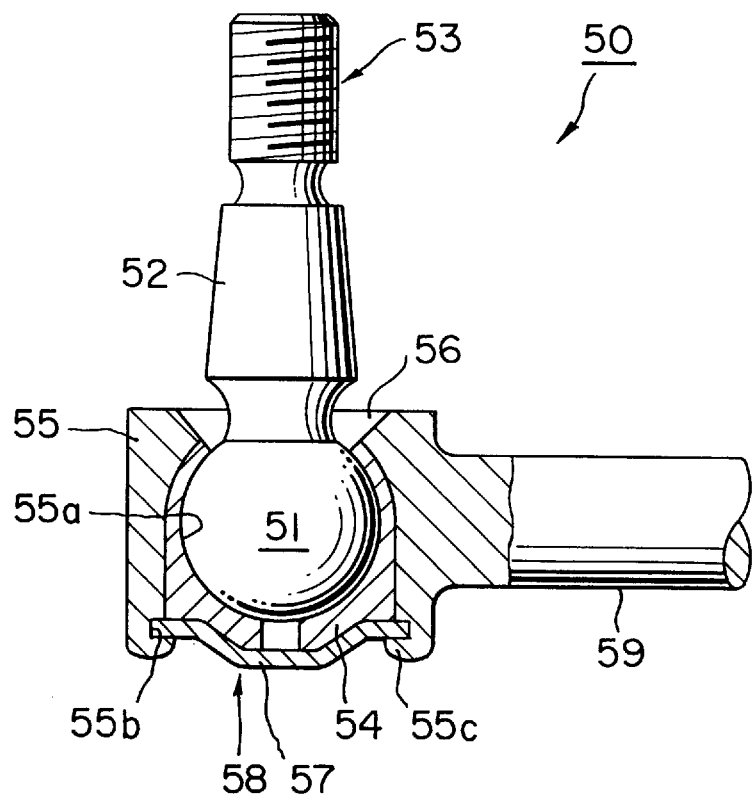
FIG. 8 is a longitudinal sectional view of a prior art ball joint.
Figure 9:
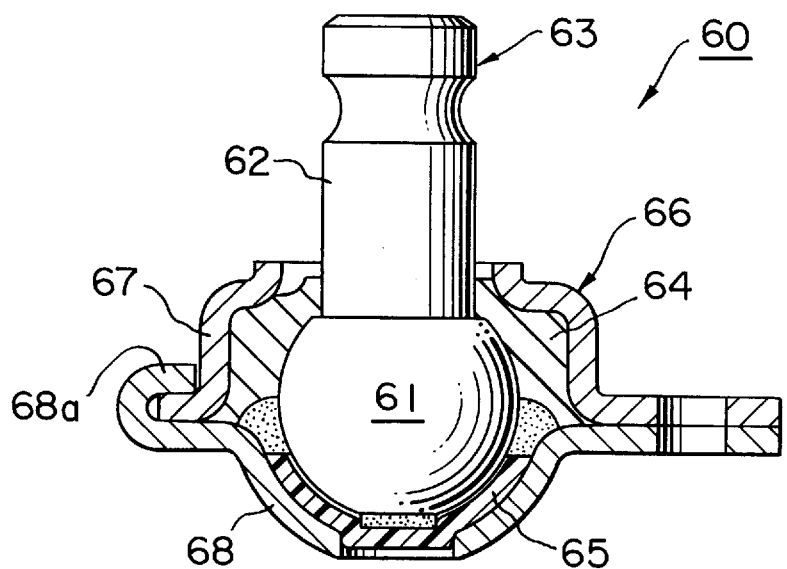
FIG. 9 is a longitudinal sectional view of another prior art ball joint.

Then, the toroidal head 12 of the bearing support rod 10 is put on the bearing 20 supporting the ball stud 30 as indicated by the arrow B in FIG. 7 so that the neck 23 of the bearing 20 is fitted in the toroidal head 12. The toroidal head 12 of the bearing support rod 10 comes into contact with the flange 24 projecting from the outer surface of the bearing 20, whereby the toroidal head 12 is positioned accurately relative to the neck 23. Therefore, the toroidal head 12 is unable to move relative to the bearing 20 past the neck 23.

The inside diameter Dr of the toroidal head 12 is smaller than the diameter Db of the neck 23, i.e., the diameter of the bottom surface of the circular groove formed in the outer surface of the bearing 20, before being fitted in the toroidal head 12. Thus, the bearing 20 as fitted in the toroidal head 12 is compressed by the toroidal head 12 and hence the open end 22 of the bearing 20 will not be able to expand. Consequently, the ball 31 is unable to come out of the bearing 20.

When the neck 23 of the bearing 20 is formed at a position nearer to the open end 22 of the bearing 20, the open end 22 can be further firmly compressed by the toroidal head 12, which further surely prevents the ball 31 from slipping out of the bearing 20.

In a state after the completion of assembly of the bearing support rod 10 and the bearings 20 as shown in FIG. 2, the extensions of the axis Ch of the straight body 11 pass the respective centers Cs of the balls 31 of the ball studs 30. Therefore, an axial force acting on the bearing support rod 10 acts on the centers Cs of the balls 31, so that any force tending to force the bearings 20 to fall off the corresponding balls 31 will not act on the bearings 20. Accordingly, the bearings 20 will never fall off the corresponding balls 31 when the ball joints 100 are in use.

As is apparent from the foregoing description, the ball joint 100 of the present invention comprises only three component parts, i.e., the bearing support rod 10, the bearing 20 and the ball stud 30 has a very simple construction.

The ball joint 100 of the present invention can be assembled simply by fitting the ball 31 of the ball stud 30 in the hollow defined by the spherical inner surface 21 of the bearing 20 and fitting the bearing 20 in the toroidal head 12 of the bearing support rod 10. The ball joint of the present invention does not need at all any complicate assembling work necessary for assembling the prior art ball joints, such as putting the end plate on the socket to hold the ball stud in place on the socket, staking the edge of the socket around the end plate to fasten the end plate in place and folding the periphery of the lower housing member to fasten together the upper housing member and the lower housing member.

The bearing support rod 10 of the ball joint 100 of the present invention can be formed by bending the opposite ends of a rod by a cold working process and the manufacture of the bearing support rod 10 does not require expensive manufacturing facilities, such as forging dies for forming the socket by forging and press dies for pressing metal sheets to form the housing members.

Thus, the present invention provides a ball joint comprising a comparatively small number of component parts, having a simple construction, capable of being easily assembled and being manufactured without using expensive facilities.

The present invention is not limited in its practical application to the preferred embodiments specifically described herein and it is obvious to those skilled in the art that many variations and modifications are possible in the light of the above explanation.

For example, although the bearing support rod 10 provided with the pair of ball joints 100 at its opposite ends, respectively, in the foregoing embodiment is used as the connecting link 8 for the automotive suspension, a pair of members can be pivotally joined for relative pivotal movement by a single ball joint 100, in which the straight body 11 of the bearing support rod 10 is welded to one of the pair of members, and the stem 32 of the ball stud 30 is screwed in the other member.

The toroidal heads 12 of the bearing support rod 10 may be of a rectangular or a polygonal shape. The rod stock for forming the bearing support rod 10 may be of a rectangular or a polygonal section. The respective sectional shapes of the body and the toroidal heads of the bearing support rod 10 may be different from each other.

In the above-described embodiment, the toroidal head 12 is provided in advance in the end portion of the bearing support rod 10, and the toroidal head 12 is engaged in the neck 23 of the bearing 20. But it is possible to modify the end portion of the support rod 10 in conformity to the neck 23 of the bearing 20 to form the toroidal head 12, whereby the bearing 20 can be engaged.

While the presently preferred embodiments of the present invention have been shown and described, it is to be understood that this disclosure is for the purpose o illustration and that various changes and modifications may be made without departing from the scope of the invention as set forth in the appended claims.

I claim:

1. A ball joint for joining first and second members so that relative pivotal movement of the members is permitted, the ball joint comprising:

a ball stud for connection to the first member;

a bearing support rod for connection to the second member; and a bearing for supporting the ball stud on the bearing support rod;

wherein the ball stud has a spherical ball portion and a stem extending from the spherical ball portion for the connection with the first member; the bearing support rod has a body formed by processing a bar stock for the connection with the second member, and a ring-shaped head formed by bending one end of the body in toroidal shape; and the bearing has a hollow spherical inner surface portion receiving the spherical ball portion and slidably covering not less than half of the spherical ball portion, an opposite open end through which the stem extends and emerges outside of the bearing when the spherical ball portion is received on the hollow spherical inner surface portion, a neck defined by a groove in an outer surface of the bearing near the open end for fitting in the ring-shaped head of the bearing support rod, and a positioning projection near the neck on the outer surface of the bearing for contact with the bearing support rod and positioning the bearing relative to the bearing support rod when fitted in the groove, an inside of the neck holding the spherical ball portion received on the hollow spherical inner surface portion of the bearing, whereby the toroidal and ring-shaped head is fitted in the groove of the bearing after the spherical ball portion is received in the hollow spherical inner surface portion of the bearing.

2. A ball joint according to claim 1, wherein the bearing is formed of an elastic polymeric material that permits the open end of the bearing to expand to an extent that permits the ball stud to pass through the expanded open end.

3. A ball joint according to claim 2, wherein the polymeric material is an elastomer.

4. A ball joint according to claim 1, wherein an inside diameter of the ring-shaped head in a state before the bearing is fitted therein is smaller than a diameter of the neck of the bearing.

5. A ball joint according to claim 1, wherein a space is formed between an end portion of the bearing support rod that forms the ring-shaped head and an outer surface of a portion of the bearing support rod forming the ring-shaped head.

6. A ball joint according to claim 1, wherein an end portion of the bearing support rod that forms the ring-shaped head is fixed to and outer surface of a portion of the bearing support rod forming the ring-shaped head.

7. A ball joint according to claim 1, wherein a center of the spherical inner surface portion is included in a plane including a center circle of the groove.

8. A ball joint according to claim 1, wherein the neck is formed in the outer circumference of the bearing near the open end.

9. A ball joint according to claim 1, wherein an extension of the axis of the body of the bearing support rod passes through the center of the spherical ball portion of the ball stud.

10. A ball joint according to claim 1, wherein the bearing support rod is formed by processing a spring steel stock.

* * * * *